United States Patent
Ide et al.

(10) Patent No.: US 9,130,199 B2
(45) Date of Patent: *Sep. 8, 2015

(54) STAINLESS STEEL FOR FUEL CELL HAVING GOOD CORROSION RESISTANCE AND METHOD FOR PRODUCING THE SAME

(75) Inventors: Shinsuke Ide, Tokyo (JP); Tomohiro Ishii, Tokyo (JP); Naoki Nishiyama, Tokyo (JP); Shin Ishikawa, Tokyo (JP); Takumi Ujiro, Tokyo (JP); Noriko Makiishi, Tokyo (JP)

(73) Assignee: JFE Steel Corporation, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 13/386,208

(22) PCT Filed: Jul. 22, 2010

(86) PCT No.: PCT/JP2010/062739
§ 371 (c)(1),
(2), (4) Date: Jul. 10, 2012

(87) PCT Pub. No.: WO2011/010746
PCT Pub. Date: Jan. 27, 2011

(65) Prior Publication Data
US 2012/0276472 A1     Nov. 1, 2012

(30) Foreign Application Priority Data

Jul. 23, 2009  (JP) .................. 2009-172307
Jul. 30, 2009  (JP) .................. 2009-177465

(51) Int. Cl.

| | | |
|---|---|---|
| H01M 2/16 | (2006.01) | |
| C25D 11/34 | (2006.01) | |
| C25D 3/04 | (2006.01) | |
| H01M 8/02 | (2006.01) | |
| C22C 38/00 | (2006.01) | |
| C22C 38/02 | (2006.01) | |
| C22C 38/04 | (2006.01) | |
| C22C 38/06 | (2006.01) | |
| C22C 38/26 | (2006.01) | |
| C22C 38/44 | (2006.01) | |
| H01M 8/08 | (2006.01) | |
| H01M 8/10 | (2006.01) | |
| H01M 8/12 | (2006.01) | |
| H01M 8/14 | (2006.01) | |

(52) U.S. Cl.
CPC ............ H01M 8/021 (2013.01); C22C 38/001 (2013.01); C22C 38/02 (2013.01); C22C 38/04 (2013.01); C22C 38/06 (2013.01); C22C 38/26 (2013.01); C22C 38/44 (2013.01); C25D 11/34 (2013.01); *H01M 8/083* (2013.01); *H01M 8/086* (2013.01); *H01M 2008/1095* (2013.01); *H01M 2008/1293* (2013.01); *H01M 2008/147* (2013.01); *Y02E 60/50* (2013.01); *Y02E 60/525* (2013.01); *Y02E 60/526* (2013.01)

(58) Field of Classification Search
None
See application file for complete search history.

(56) References Cited

U.S. PATENT DOCUMENTS

| | | | | |
|---|---|---|---|---|
| 4,070,208 | A * | 1/1978 | Hayami et al. | 148/610 |
| 4,818,572 | A | 4/1989 | Shimamune et al. | |
| 5,000,828 | A * | 3/1991 | Shindou et al. | 205/130 |
| 6,814,848 | B2 * | 11/2004 | Fujimoto et al. | 205/81 |
| 6,835,466 | B2 * | 12/2004 | Fujimoto et al. | 428/659 |
| 2003/0170526 | A1 | 9/2003 | Hodgson et al. | |

FOREIGN PATENT DOCUMENTS

| | | | |
|---|---|---|---|
| JP | H06-173085 A | | 6/1994 |
| JP | 9-291400 | | 11/1997 |
| JP | 11323502 | * | 11/1999 |
| JP | 2000-239806 | | 9/2000 |
| JP | 2003-223902 | | 8/2003 |
| JP | 2003-297379 | | 10/2003 |
| JP | 2008-277146 | | 11/2008 |
| JP | 2009-224151 | * | 10/2009 |
| WO | WO 02/13300 A1 | | 2/2002 |
| WO | WO 2008/130078 A1 | | 10/2008 |
| WO | WO2009/016969 A1 | | 2/2009 |

OTHER PUBLICATIONS

Yang et al. J. Electrochem. Soc., 2003, vol. 150, 9, 1188-1201.*
Maziasz et al, INt. Journal Hydrogen. Energy, 2007, 32, 3622-3630.*
Schoeler et al. Mat and Corr., 2000, 1-11.*
International Search Report dated Nov. 2, 2010, Application No. PCT/JP2010/062739.
Chemical Composition of Stainless Steel, May 6, 2008, XP002700210, retrieved from the Internet: URL:http://www.yamco-yamashin.com/en/products/guide stainless steel.htm/.
Supplementary European Search Report dated Jul. 5, 2013, application No. EP10802366.

* cited by examiner

*Primary Examiner* — Vera Katz
(74) *Attorney, Agent, or Firm* — RatnerPrestia

(57) ABSTRACT

A stainless steel for a fuel cell having good corrosion resistance throughout a wide potential range and a method for producing the same are provided. In particular, a coating having an intensity ratio [(OO/OH)/(Cr/Fe)] of 1.0 or more determined by X-ray photoelectron spectroscopy analysis is formed by performing an anodic electrolyzation treatment on a surface of a stainless steel in an electrolyte solution, the stainless steel containing 16% by mass or more of Cr and preferably having a composition that includes, in terms of percent by mass, C: 0.03% or less, Si: 1.0% or less, Mn: 1.0% or less, S: 0.01% or less, P: 0.05% or less, Al: 0.20% or less, N: 0.03% or less, Cr: 20 to 40%, at least one selected from Nb, Ti, and Zr, in total: 1.0% or less, and the balance being Fe and unavoidable impurities.

14 Claims, 1 Drawing Sheet

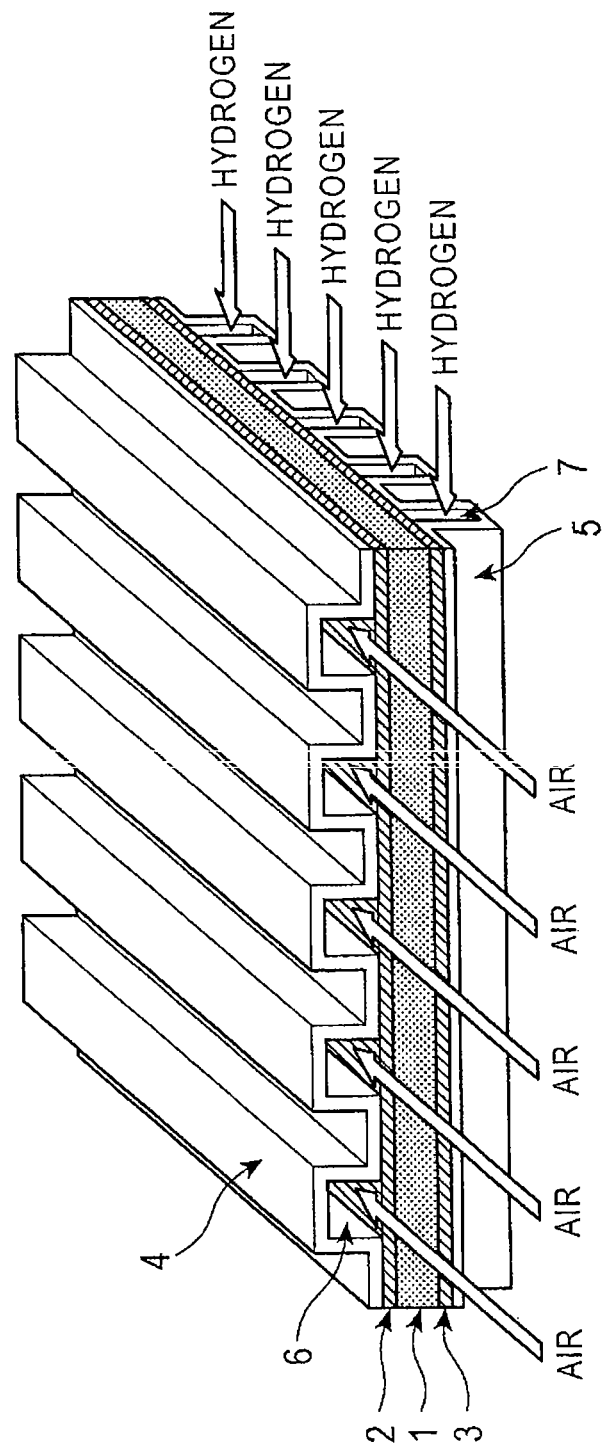

STAINLESS STEEL FOR FUEL CELL HAVING GOOD CORROSION RESISTANCE AND METHOD FOR PRODUCING THE SAME

CROSS REFERENCE TO RELATED APPLICATIONS

This application is the U.S. National Phase application of PCT International Application No. PCT/JP2010/062739, filed Jul. 22, 2010, and claims priority to Japanese Patent Application No. 2009-172307, filed Jul. 23, 2009, and Japanese Patent Application No. 2009-177465, filed Jul. 30, 2009, the disclosures of which PCT and priority applications are incorporated herein by reference in their entirety for all purposes.

FIELD OF THE INVENTION

The present invention relates to a stainless steel for a fuel cell, having good corrosion resistance in an operating environment of a fuel cell and method for producing the stainless steel.

BACKGROUND OF THE INVENTION

Recent years have seen development of fuel cells that have good power generation efficiency and do not emit carbon dioxide from the viewpoint of preserving the global environment. This fuel cell generates power by causing hydrogen and oxygen to react with each other. A basic structure of a fuel cell resembles a sandwich and is constituted by an electrolyte membrane (i.e., ion exchange membrane), two electrodes (i.e., a fuel electrode and an air electrode), a diffusion layer for diffusing hydrogen and oxygen (air), and two separators. Phosphoric-acid fuel cells, molten carbonate fuel cells, solid-oxide fuel cells, alkaline fuel cells, proton-exchange membrane fuel cells, and the like have been developed in accordance with the type of electrolyte used.

Of these fuel cells, proton-exchange membrane fuel cells in particular have the following advantages over molten carbonate fuel cells, phosphoric-acid fuel cells, and the like:
(a) Operating temperature is significantly low, i.e., about 80° C.
(b) Weight- and size-reduction of the fuel cell main body is possible.
(c) The time taken for start-up is short and fuel efficiency and output density are high.

Accordingly, proton-exchange membrane fuel cells are one of the most prospective fuel cells today, for onboard power supplies for electric vehicles and portable and compact dispersed power systems for household use (stationary type compact electric generator).

A proton-exchange membrane fuel cell is based on the principle of extracting power from hydrogen and oxygen through a polymer membrane and has a structure shown in FIG. 1, in which a membrane-electrode assembly 1 is sandwiched by gas diffusion layers 2 and 3 such as carbon cloths and these form a single constitutional element (also known as a single cell). Electromotive force is generated between the separators 4 and 5.

The membrane-electrode assembly 1 is also known as MEA (Membrane-Electrode Assembly) and is made by integrating a polymer membrane and an electrode material such as carbon black carrying a platinum catalyst, the electrode material being provided on front and back surfaces of the polymer membrane. The thickness of the membrane-electrode assembly 1 is several ten to several hundred micrometers. The gas diffusion layers 2 and 3 are frequently integrated with the membrane-electrode assembly 1.

When proton-exchange membrane fuel cells are applied to the usages described above, several ten to several hundred single cells described above are connected in series to form a fuel cell stack, and the fuel cell stack is used.

The separators 4 and 5 are required to have
(A) a function of a separator that separates between single cells each other, as well as
(B) a function of an electric conductor that carries electrons generated;
(C) a function of a channel for oxygen (air) and hydrogen (air channels 6 and hydrogen channels 7 in FIG. 1); and
(D) a function of a discharge channel for discharging water and gas generated (air channels 6 and hydrogen channels 7 also serve as this discharge channel).

In order to use a proton-exchange membrane fuel cell in practical application, separators having good durability and conductivity must be used.

The durability expected is about 5000 hours for fuel cells for electric vehicles and about 40000 hours for stationary type electric generators used as compact dispersed power systems for household use and the like.

Proton-exchange membrane fuel cells that have been put to practice hitherto use carbon materials as separators. However, since the separators using carbon materials are susceptible to fracture upon impact, they have the drawbacks that not only the size-reduction is difficult but also the process cost for forming channels is high. In particular, the cost problem has been the largest impediment for spread of fuel cells.

In response, attempts have been made to use a metal material, in particular, stainless steel, instead of carbon materials as the material for separators.

The operating environment the separators are exposed to are characteristic in that the environment is acidic and has a high temperature of 70° C. or higher and the expected potential range is as wide as from about 0 V vs SHE to 1.0 V vs SHE or higher (hereinafter all potentials are versus SHE and simply denoted as V). In order to use stainless steel, the corrosion resistance in the expected potential range needs to be improved. In particular, at and near 1.0 V, transpassive dissolution of Cr, which is the main element of the stainless steel, occurs and thus it is difficult to maintain corrosion resistance solely by Cr on one hand. On the other hand, Cr is primarily responsible for maintaining the corrosion resistance at 0.6 V or less. Thus, according to the conventional art, the corrosion resistance could not be maintained in a wide potential range from a low potential to a high potential.

For example, patent document 1 discloses a stainless steel for a separator in which the corrosion resistance is improved from the composition aspect by increasing the Cr and Mo contents.

Patent document 2 discloses a method for producing a separator for a low-temperature-type fuel cell characterized in that a stainless steel sheet containing 0.5 mass % or more of Cu is subjected to alternation electrolytic etching of alternately performing anodic electrolyzation at a potential of +0.5 V or more and cathodic electrolyzation at a potential between −0.2 V and −0.8 V in an aqueous solution of ferric chloride.

Patent document 3 discloses a stainless steel conductive part and method of producing the same that has excellent conductivity and low contact electrical resistance formed by modifying a passive film on a stainless steel surface by injecting fluorine in the passive film.

PATENT DOCUMENTS

Patent document 1: Japanese Unexamined Patent Application Publication No. 2000-239806

Patent document 2: Japanese Unexamined Patent Application Publication No. 2003-297379

Patent document 3: Japanese Unexamined Patent Application Publication No. 2008-277146

SUMMARY OF THE INVENTION

It has been discovered that the potential expected in the technique disclosed in patent document 1 is limited to 0.2 V and thus corrosion resistance is presumably insufficient, for example, at and near 1.0 V at which transpassive dissolution occurs.

Moreover, according to the technique disclosed in patent document 2, since it is characterized that a coating mainly composed of Cr incorporating Cu is formed, the passive dissolution of Cr described above easily occurs and corrosion resistance decreases in an acidic high-potential environment where Cu is also corroded.

The technique disclosed in patent document 3 does not expect use in a severe corroding environment such as fuel cells. Since the Cr concentration is high in the passive films, transpassive dissolution easily occurs and the corrosion resistance is insufficient.

Considering the above problems of the related art, the present invention aims to provide a stainless steel for a fuel cell having good corrosion resistance in a wide potential range. Further, the present invention aims to provide an advantageous method for producing the stainless steel.

The inventors have conductive extensive investigations on ways to improve corrosion resistance in a wide potential range.

As a result, the inventors have found that the corrosion resistance is improved over a wide potential range from a low potential to a high potential by enhancing oxidic bonds in a surface coating and controlling the Cr-to-Fe ratio in an adequate range through performing anodic electrolyzation of a stainless steel having 16% by mass or more Cr and further the component composition thereof being adjusted, in an electrolyte solution containing sodium sulfate.

The present invention has been made based on this finding.

The summary of the structures of embodiments of the present invention is as follows.

(1) A stainless steel for a fuel cell, including a coating having an intensity ratio [(OO/OH)/(Cr/Fe)] of 1.0 or more determined by X-ray photoelectron spectroscopy analysis on a surface of a stainless steel containing 16% by mass or more of Cr.

(2) A stainless steel for a fuel cell having good corrosion resistance, characterized by a coating being formed on a surface of a stainless steel having a composition that includes, in terms of percent by mass, C: 0.03% or less, Si: 1.0% or less, Mn: 1.0% or less, S: 0.01% or less, P: 0.05% or less, Al: 0.20% or less, N: 0.03% or less, Cr: 20 to 40%, at least one selected from Nb, Ti, and Zr, in total: 1.0% or less, and the balance being Fe and unavoidable impurities, by performing an anodic electrolyzation treatment in an electrolyte solution, and having an intensity ratio [(OO/OH)/(Cr/Fe)] of 1.0 or more determined by X-ray photoelectron spectroscopy analysis.

(3) The stainless steel for a fuel cell having good corrosion resistance according to (1) or (2) above, characterized in that the stainless steel further contains, in terms of percent by mass, Mo: 4.0% or less.

(4) The stainless steel for a fuel cell having good corrosion resistance according to (2) or (3) above, characterized for that the anodic electrolyzation treatment is performed in an electrolyte solution having a sodium sulfate concentration of 0.1 to 3.0 mol/L and pH of 7 or less at a potential of 0.8 to 1.8 V vs. SHE for 10 seconds or longer.

(5) The stainless steel for a fuel cell having good corrosion resistance according to any one of (1) to (4) above, characterized in that an intensity ratio (OO/OH) of the coating on the surface is 0.6 or more determined by X-ray photoelectron spectroscopy analysis.

(6) The stainless steel for a fuel cell having good corrosion resistance according to any one of (1) to (5) above, characterized in that an intensity ratio (Cr/Fe) of the coating on the surface is 0.2 or more and 1.0 or less determined by X-ray photoelectron spectroscopy analysis.

(7) A method for producing a stainless steel for a fuel cell having good corrosion resistance, characterized by performing an anodic electrolyzation treatment on a stainless steel containing 16% by mass or more of Cr in an electrolyte solution at a potential of 0.5 V vs. SHE or more for 10 seconds or longer.

(8) The method for producing a stainless steel for a fuel cell having good corrosion resistance according to (7) above, characterized in that pH of the electrolyte solution is 7 or less.

(9) The method for producing a stainless steel for a fuel cell having good corrosion resistance according to claim (7) or (8) above, characterized in that the electrolyte solution has a sodium sulfate concentration of 0.1 to 3.0 mol/L.

(10) A method for producing a stainless steel for a fuel cell having good corrosion resistance, characterized by forming a coating having an intensity ratio [(OO/OH)/(Cr/Fe)] of 1.0 determined by X-ray photoelectron spectroscopy analysis on a surface of a stainless steel by the method according to any one of (7) to (9) above.

According to the present invention, a stainless steel for a fuel cell having good corrosion resistance throughout a wide potential range in an operating environment of separators can be obtained at low cost.

BRIEF DESCRIPTION OF DRAWINGS

FIG. 1 is a schematic diagram showing a basic structure of a fuel cell.

DESCRIPTION OF EMBODIMENTS OF THE INVENTION

The invention will now be specifically described with reference to exemplary embodiments.

First, a stainless steel encompassed by the present invention is described.

According to the present invention, the stainless steel used as a base material is not particularly limited in terms of steel type or the like as long as the stainless steel has corrosion resistance required under the operating environment of fuel cells, and may be austenitic, ferritic, or dual phase. In order to ensure the minimum level of corrosion resistance, 16% by mass or more of Cr is advantageously contained. A preferable Cr content is 18% by mass or more.

In the present invention, a steel that forms a coating having good corrosion resistance throughout a wide potential range on a surface of the stainless steel by an anodic electrolyzation treatment is preferred.

Particularly preferable component compositions of ferritic, austenitic, and dual-phase stainless steels are as follows. Note that the notation "%" related to components is % by mass unless otherwise noted.

(1) Preferred Component Composition of Ferritic Stainless Steel

C: 0.03% or Less

Carbon bonds to Cr in the steel and decreases the corrosion resistance and thus the C content is preferably as low as possible. The corrosion resistance is not significantly decreased as long as the carbon content is 0.03% or less. Accordingly, the C content is limited to 0.03% or less and preferably 0.015% or less.

Si: 1.0% or Less

Silicon is an element used in deoxidation but decreases ductility when contained in an excessively large amount. Thus, the Si content is limited to 1.0% or less and preferably 0.5% or less.

Mn: 1.0% or Less

Manganese bonds to S to form MnS and decreases the corrosion resistance. Thus, the Mn content is limited to 1.0% or less and preferably 0.8% or less.

S: 0.01% or Less

As described above, S bonds to Mn to form MnS and decreases the corrosion resistance. Thus the S content is limited to 0.01% or less and preferably 0.008% or less.

P: 0.05% or Less

Phosphorus decreases ductility and the P content is preferably as low as possible. The ductility is not significantly decreased as long as the P content is 0.05% or less. Thus, the P content is limited to 0.05% or less and preferably 0.04% or less.

Al: 0.20% or Less

Aluminum is an element used in deoxidation but decreases the ductility when contained in an excessively large amount. Thus, the Al content is limited to 0.20% or less and preferably 0.15% or less.

N: 0.03% or Less

Nitrogen bonds to Cr in the steel and decreases the corrosion resistance and thus the N content is preferably as low as possible. The corrosion resistance is not significantly decreased as long as the N content is 0.03% or less. Thus, the N content is limited to 0.03% or less and preferably 0.015% or less.

Cr: 16% or More

Chromium is an essential element for a stainless steel to maintain corrosion resistance and needs to be contained in an amount of 16% or more. Particularly, from the viewpoint of improving corrosion resistance in a wide potential range, the Cr content is preferably in the range of 20% to 40%. This is because, at a Cr content less than 20%, the corrosion resistance of a parent material itself is decreased, the passive current is increased, and thus the corrosion resistance tends to decrease in an environment of 0.6 V or less in particular. In contrast, when the Cr content exceeds 40%, transpassive dissolution easily occurs at and near 1.0 V. The Cr content is preferably 24% to 35%.

At least one selected from Nb, Ti, and Zr, in total: 1.0% or less

All of Nb, Ti, and Zr are useful elements that fix C and N in the steel by forming carbides, nitrides, and carbonitrides, and improve corrosion resistance. However, when the content exceeds 1.0%, the ductility is significantly decreased. Thus, the content thereof is limited to 1.0% or less irrespective of whether these elements are added alone or in combination. In order for these elements to sufficiently exhibit effects of addition, the content is preferably 0.02% or more.

While essential components are described above, the following other elements may be added as needed in the present invention.

Mo: 4.0% or Less

Molybdenum is an element effective for improving corrosion resistance, in particular, local corrosion resistance, of a stainless steel. In order to achieve this effect, 0.02% or more of Mo is preferably added. However, since the ductility decreases when the Mo content exceeds 4.0%, the Mo content is limited to 4.0% or less and preferably 2.0% or less.

In addition, 1.0% or less of each of Ni, Cu, V, and W may be contained to improve the corrosion resistance and 0.1% or less of each of Ca, Mg, REM (Rare Earth Metals), and B may be contained to improve hot workability.

The balance is Fe and unavoidable impurities. Among the unavoidable impurities, O (oxygen) content is preferably 0.02% or less.

(2) Preferred Component Composition of Austenitic Stainless Steel

C: 0.08% or Less

Since carbon reacts with Cr in an austenitic stainless steel for a separator to form a compound and precipitates as a Cr carbide in grain boundaries, it deteriorates corrosion resistance. Accordingly, the C content is preferably as low as possible and corrosion resistance is not significantly impaired as long as the C content is 0.08% or less. Thus, the C content is limited to 0.08% or less and preferably 0.03% or less.

Cr: 16 to 30%

Chromium is an essential element for an austenitic stainless steel sheet to maintain the basic corrosion resistance. When the Cr content is less than 16%, the steel sheet cannot be used as a separator for a long time. In contrast, when the Cr content exceeds 30%, it is difficult to obtain austenite microstructures. Accordingly, the Cr content needs to be in the range of 16% to 30% and preferably 18% to 26%.

Mo: 0.1 to 10.0%

Molybdenum is an element effective for suppressing local corrosion, such as crevice corrosion, of an austenitic stainless steel for a separator. In order to achieve this effect, the Mo content needs to be 0.1% or more. At a Mo content exceeding 10.0%, the stainless steel for a separator becomes significantly brittle and the productivity is decreased. Thus, the Mo content needs to be in the range of 0.1 to 10.0% and preferably 0.5 to 7.0%.

Ni: 7 to 40%

Nickel is an element that stabilizes austenite phases. At a Ni content less than 7%, the effect of stabilizing austenite phases is not achieved. At a Ni content exceeding 40%, the cost rises due to excessive consumption of Ni. Accordingly, the Ni content needs to be in the range of 7 to 40%.

The austenitic stainless steel for a separator according to the present invention may contain following elements if necessary in addition to the above-described C, Cr, Mo, and Ni.

N: 2.0% or Less

Nitrogen has an effect of suppressing local corrosion of an austenitic stainless steel for a separator. However, it is industrially difficult to have the N content exceed 2.0% and thus the upper limit is 2.0%. Furthermore, according to a usual melting and refining method, the time taken for the stainless steel for a separator to contain more than 0.4% of N becomes long, resulting in a decrease in productivity. Thus, the N content is preferably 0.4% or less from the standpoint of cost. More preferably, the N content is in the range of 0.01 to 0.3%.

Cu: 3.0% or Less

Copper is an element that improves corrosion resistance of the austenitic stainless steel for a separator. In order to obtain this effect, the Cu content is preferably 0.01% or more. At a Cu content exceeding 3.0%, the hot workability is decreased and the productivity is decreased. Thus, when Cu is contained, the Cu content is preferably 3.0% or less and more preferably in the range of 0.01 to 2.5%.

Si: 1.5% or Less

Silicon is an element effective for deoxidation and added at the stage of melting and refining an austenitic stainless steel for a separator. In order to achieve this effect, the Si content is preferably 0.01% or more. When an excessive amount of Si is contained, the stainless steel hardens and exhibits a decreased ductility. Thus, when Si is contained, the Si content is preferably 1.5% or less and more preferably in the range of 0.01 to 1.0%.

Mn: 2.5% or Less

Manganese bonds to S which is inevitably mixed and has an effect of decreasing the solid solute S content in the austenitic stainless steel for a separator. Thus, manganese is an effective element for suppressing grain boundary segregation of S and preventing cracking during hot rolling. Such effects are exhibited when the Mn content is 0.001% or more and 2.5% or less. Thus, when Mn is contained, the Mn content is preferably 2.5% or less and more preferably in the range of 0.001 to 2.0%.

At least one selected from Ti, Nb, V, and Zr, in total: 0.01 to 0.5%

All of Ti, Nb, V, and Zr react with C in the austenitic stainless steel to form carbides. Since Ti, Nb, V, and Zr fix C as such, they are effective elements for improving grain boundary corrosion resistance of the austenitic stainless steel for a separator. In particular, when the C content is 0.08% or less, the effect of improving the corrosion resistance by incorporation of at least one of Ti, Nb, V, and Zr is achieved when the content is 0.01% or more irrespective of whether Ti, Nb, V, and Zr are contained alone or in combination.

This effect is saturated when Ti, Nb, V, and Zr are contained alone or in combination in an amount exceeding 0.5%. Thus, when Ti, Nb, V, or Zr is to be contained, at least one of these elements is preferably contained in a total amount in the range of 0.01 to 0.5%.

In the present invention, as other than the above described elements, 0.1% by mass or less of each of Ca, Mg, B, and a rare earth element (a.k.a. REM) may be contained to improve the hot workability of the austenitic stainless steel for a separator and 0.2% by mass or less of Al may be contained for a deoxidation purpose at the smelting stage.

The balance is Fe and unavoidable impurities. Among the unavoidable impurities, O (oxygen) content is preferably 0.02% or less.

(3) Preferred Component Composition of Dual-Phase Stainless Steel

C: 0.08% or Less

Since carbon reacts with Cr to form a compound and precipitates as a Cr carbide in grain boundaries, it deteriorates corrosion resistance. Accordingly, the C content is preferably as low as possible and corrosion resistance is not significantly impaired as long as the C content is 0.08% or less. Thus, the C content is limited to 0.08% or less and preferably 0.03% or less.

Cr: 16 to 30%

Chromium is an essential element for a dual-phase stainless steel sheet to maintain the basic corrosion resistance. When the Cr content is less than 16%, the steel sheet cannot be used as a separator for a long time. In contrast, when the Cr content exceeds 30%, it is difficult to obtain dual-phase microstructures. Accordingly, the Cr content needs to be in the range of 16% to 30% and preferably 20% to 28%.

Mo: 0.1 to 10.0%

Molybdenum is an element effective for suppressing local corrosion, such as crevice corrosion. In order to achieve this effect, the Mo content needs to be 0.1% by mass or more. At a Mo content exceeding 10.0%, the stainless steel becomes significantly brittle and the productivity is decreased. Thus, the Mo content needs to be in the range of 0.1 to 10.0% and preferably 0.5 to 7.0%.

Ni: 1 to 10%

Nickel is an element that stabilizes austenite phases. At a Ni content less than 1%, it is difficult to generate austenite phases and a dual-phase microstructure is thus difficult to be obtained. At a Ni content exceeding 10%, it is difficult to generate ferrite phases and thus a dual-phase microstructure is difficult to be obtained.

Accordingly, the Ni content needs to be in the range of 1 to 10%.

The dual-phase stainless steel for a separator according to the present invention may contain following elements if needed in addition to C, Cr, Mo, and Ni described above.

N: 2.0% or Less

Nitrogen is an element that suppresses local corrosion of a dual-phase stainless steel for a separator. However, it is industrially difficult to have the N content exceed 2.0% and thus the upper limit is 2.0%. Furthermore, according to a usual melting and refining method, the time taken for the stainless steel for a separator to contain more than 0.4% of N becomes long, resulting in a decrease in productivity. Thus, the N content is preferably 0.4% or less from the standpoint of cost. More preferably, the N content is in the range of 0.01 to 0.3%.

Cu: 3.0% or Less

Copper is an element that improves corrosion resistance of the dual-phase stainless steel for a separator. In order to obtain this effect, the Cu content is preferably 0.01% or more. At a Cu content exceeding 3.0%, the hot workability is decreased and the productivity is decreased. Thus, when Cu is contained, the Cu content is preferably 3.0% or less and more preferably in the range of 0.01 to 2.5%.

Si: 1.5% or Less

Silicon is an element effective for deoxidation and added at the stage of melting and refining a dual-phase stainless steel for a separator. In order to achieve this effect, the Si content is preferably 0.01% or more. When an excessive amount of Si is contained, the stainless steel for a separator hardens and exhibits a decreased ductility. Thus, when Si is contained, the Si content is preferably 1.5% or less and more preferably in the range of 0.01 to 1.0%.

Mn: 2.5% or Less

Manganese bonds to S which is inevitably mixed and has an effect of decreasing the solid solute S content in the dual-phase stainless steel for a separator. Thus, manganese is an effective element for suppressing grain boundary segregation of S and preventing cracking during hot rolling. Such effects are exhibited when the Mn content is 0.001% or more and 2.5% or less. Thus, when Mn is contained, the Mn content is preferably 2.5% or less and more preferably in the range of 0.001 to 2.0%.

At Least One Selected from Ti, Nb, V, and Zr, in Total: 0.01 to 0.5%

All of Ti, Nb, V, and Zr react with C in the dual-phase stainless steel to form carbides. Since Ti, Nb, V, and Zr fix C as such, they are effective elements for improving grain boundary corrosion resistance of the dual-phase stainless steel for a separator. In particular, when the C content is 0.08% or less, the effect of improving the corrosion resistance by incorporation of at least one of Ti, Nb, V, and Zr is achieved when the content is 0.01% or more irrespective of whether Ti, Nb, V, and Zr are contained alone or in combination.

This effect is saturated when Ti, Nb, V, and Zr are contained alone or in combination in an amount exceeding 0.5%. Thus, when Ti, Nb, V, or Zr is to be contained, at least one of these elements is preferably contained in a total amount in the range of 0.01 to 0.5%.

In the present invention, 0.1% by mass or less of each of Ca, Mg, B, and a rare earth element (a.k.a. REM) may be contained to improve the hot workability of the dual-phase stainless steel for a separator and 0.2% by mass or less of Al may be contained for a deoxidation purpose at the stage of molten steel.

The balance is Fe and unavoidable impurities. Among the unavoidable impurities, O (oxygen) content is preferably 0.02% or less.

Next, the features that the coating on a surface of a stainless steel should have are described.

Intensity ratio [(OO/OH)/(Cr/Fe)] determined by X-ray Photoelectron Spectroscopy (XPS) is 1.0 or more The studies conducted by the inventors have found that in order to control the coating to be stable throughout a wide potential range, the intensity ratio (OO/OH)/(Cr/Fe) determined by XPS should be studied and it is effective to control this intensity ratio to 1.0 or more.

That is, when the ratio (OO/OH) of the content (OO of oxygen taking form of a metal oxide to the content of oxide (OH) taking form of a metal hydroxide in a coating is small, the coating becomes instable and corrosion resistance is decreased. When the ratio of the chromium content (Cr) to the iron content (Fe) taking form of an oxide or a hydroxide in a coating is large, the corrosion resistance is decreased due to serious transpassive dissolution of Cr at a high potential.

However, it has been found that when (OO/OH) is high in such a case, transpassive dissolution of Cr can be suppressed and that, in particular, when (OO/OH)/(Cr/Fe) is 1.0 or more, corrosion resistance can be improved in a wide potential range.

A preferable range of (OO/OH) ratio is (OO/OH) 0.6. When (Cr/Fe) is less than 0.2, corrosion resistance at a low potential in particular may be decreased and when (Cr/Fe) is more than 1.0, corrosion resistance at a high potential may be decreased. Thus, the (Cr/Fe) ratio is preferably 0.2 or more and 1.0 or less.

The (OO/OH) ratio and the (Cr/Fe) ratio are determined from the results of XPS. The largest value among the maximum points or inflection points of the intensity at a binding energy of 528 to 531 eV for (OO), 531 to 534 eV for (OH), 575 to 578 eV for (Cr), and 709 to 713 eV for (Fe) was employed. In the case where the increase or decrease was monotonic, it was determined that there was no peak and the value of the minimum point was employed.

A coating that has a (OO/OH)/(Cr/Fe) ratio of 1.0 or more such as one described above can be formed by an anodic electrolyzation treatment of a stainless steel in an electrolyte solution. The anodic electrolyzation treatment refers to an electrolyzation treatment that includes anodic electrolyzation. In the case where the anodic electrolyzation is performed a plurality of times, the total time is assumed to be the anodic electrolyzation treatment time.

In order to form a coating having an (OO/OH)/(Cr/Fe) ratio of 1.0 or more, the anodic electrolyzation treatment must be conducted in an electrolyte solution at a potential of 0.5 V or more for 10 seconds or more.

When the potential is less than 0.5 V in the anodic electrolyzation treatment, the enhancement of the oxidic bonds is insufficient and thus the corrosion resistance may become deficient particularly when exposed to a high potential environment. Thus, the potential is limited to 0.5 V or more. In order to control the potential to a level exceeding 3.0 V, a significantly high current density is needed and the power cost will increase despite saturation of the effect. Thus, the potential is preferably 3.0 V or less. More preferably, the potential is 0.8 to 1.8 V. This is because at a potential less than 0.8 V, the (OO/OH) ratio is small and it is difficult to stabilize the (OO/OH)/(Cr/Fe) ratio to 1.0 or more and at a potential exceeding 1.8 V, a large current is needed to control the potential and the increase in power cost overwhelms the effect obtained thereby.

When the electrolyzation treatment time is less than 10 seconds, enhancement of the oxidic bonds is insufficient and the probability that the corrosion resistance will become deficient when exposed to a high potential environment is increased. Thus, the treatment time is limited to 10 second or more. Moreover, the (OO/OH) ratio is decreased and it becomes difficult to adjust the (OO/OH)/(Cr/Fe) ratio to 1.0 or more. Although the upper limit of the treatment time is not particularly limited, the treatment time is preferably 300 seconds or less because the conductivity of the coating may decrease if the treatment time is excessively long.

The electrolyte solution preferably has a pH of 7 or less. This is because at pH>7, the (OO/OH) ratio is decreased and it thereby becomes difficult to adjust the (OO/OH)/(Cr/Fe) ratio to 1.0 or more. Moreover, when pH of the electrolyte solution exceeds 7, enhancement of oxidic bonds becomes insufficient.

For example, sodium sulfate is advantageously used as a component of the electrolyte solution, but alternatively, a halogen-free salt or the like that has high solubility in water can be used. The concentration of the salt above is preferably 0.1 to 3.0 mol/L in any cases. This is because as long as the concentration is 0.1 mol/L, the effect is achieved but the effect is saturated when the salt or salts is contained excessively beyond 3.0 mol/L. The treatment temperature is preferably about 50 to 90° C. in any cases.

In the present invention, the method for producing a stainless steel used as the base material is not particularly limited and any known method may be employed. However, preferable production conditions are as follows.

A slab having a component composition adjusted to a preferable range is heated to a temperature of 1150° C. or more, then hot-rolled, annealed subsequently at a temperature of 1000 to 1100° C., and subjected to repeated cold rolling and annealing to obtain a stainless steel sheet. The thickness of the obtained stainless steel sheet is preferably about 0.02 to 0.8 mm.

EXAMPLES

Example 1

A steel (ferritic stainless steel) having a chemical composition shown in Table 1 was melted in a vacuum melting furnace and the obtained ingot was heated to 1150° C. or more and then hot-rolled into a hot-rolled sheet having a thickness of 5 mm. The hot-rolled sheet was annealed at 1000° C. to 1100° C., pickled to remove scales, and then repeatedly subjected to cold rolling, annealing, and pickling to form a cold-rolled annealed sheet having a thickness of 0.7 mm. The obtained cold-rolled annealed sheet was subjected to an anodic electrolyzation treatment in a 80° C. aqueous solution of sodium sulfate (1.4 mol/L) for 60 seconds at 1.4 V (60 mA/cm$^2$).

After the electrolyzation treatment, a surface (coating) of the resulting steel sheet was analyzed by X-ray photoelectron spectroscopy analysis to determine the intensity ratios (OO/OH), (Cr/Fe), and (OO/OH)/(Cr/Fe).

The results compared with the cases when no electrolyzation was conducted are shown in Table 2.

As shown in Table 2, when the electrolyzation treatment is performed according to embodiments of the present invention, a surface coating having an intensity ratio [(OO/OH)/

(Cr/Fe)] of 1.0 or more determined by X-ray photoelectron spectroscopy analysis was obtained.

In the table, the atomic ratio (Cr/Fe) (unit: atom %) in the coating is also shown. This is the atomic ratio Cr/Fe in the coating determined by X-ray photoelectron spectroscopy analysis. This value is calculated by eliminating peaks from base iron in a metallic state and using only the signals of an oxide or hydroxide state from the coating. To be more specific, the spectra of Fe2p and Cr2p were measured and subjected to a Shirley background treatment. Then, the peaks of metals and the peaks of oxides or hydroxides were separated from one another. Since the peaks of metals are signals generated from the base iron portion beneath the coating, the remainder obtained by eliminating the metal peaks from the entire peaks are assumed to be the peaks generated from the coating. The ratio of the area of the peaks generated from the coating to the area of the entire peaks before separation is calculated as Y.

The Cr/Fe atomic ratio in the coating can be calculated from the formula below where $I_{Cr2p}$ is an intensity for Cr2p and $I_{Fe2p}$ is an intensity for Fe2p in the entire spectra before peak separation, $RSF_{Cr2p}$ and $RSF_{Fe2p}$ are relative sensitivity factors (hereinafter referred to as RFS) for Cr2p and Fe2p, respectively, $Y_{Fe-O}$ is Y generated from the coating in the Fe2p spectrum, and $Y_{Cr-O}$ is Y generated from the coating in the Cr2p spectrum:

$$\text{Cr/Fe in coating (atomic ratio)} = (I_{Cr}/RSF_{Cr})/(I_{Fe}/RSF_{Fe}) \times (Y_{Cr-O}/Y_{Fe-O})$$

In the studies of the present invention, XPS AXIS-HS produced by KRATOS was used and measurement was conducted by using a monochromatic AlKα X-ray source. The measurement region was 250 μm×500 μm. The relative sensitivity factor RSF installed in this instrument was used as the RSF after confirming that sufficient accuracy for quantifying Fe and Cr is achieved by using stainless steel-based reference samples. It can be understood from the results that the atomic ratio (atom %) Cr/Fe in the coating is outside the invention range of patent document 3 when the electrolyzation treatment according to embodiments of the present invention is performed.

Example 2

A 30 mm×30 mm test piece was cut out from a cold-rolled annealed sheet and an electrolyzed material and shown in Table 2, degreased with acetone, and subjected to a polarization treatment in the following order at a sweep velocity of 60 mV/min in sulfuric acid having pH of 3 (80° C.) simulating the operating environment of a fuel cell to evaluate corrosion resistance from a high-potential environment to a low-potential environment:
(1) corrosion potential→1.2 V→0.8 V
(2) 0.8 V→1.2 V→0.8 V
(3) 0.8 V→1.2 V→0.8 V
(4) 0.8 V→1.2 V→0.8 V
(5) 0.8 V→1.2 V→0.7 V
(6) 0.7 V→1.2 V→0.6 V
(7) 0.6 V→1.2 V→0.5 V
(8) 0.5 V→1.2 V→0.4 V
(9) 0.4 V→1.2 V→0.3 V The flowing current includes dissolution, oxidation, reduction, etc. of the respective elements. However, it is obvious that the corrosion resistance of the material that corresponds to a smaller flowing current i.e., that does hardly undergo the above-described reactions is high. Accordingly, the values of the flowing current were compared. In particular, the maximum current density (absolute value) of the cycles (2) and (9) was determined.

The results are shown in Table 3. The cases where both values were 5.0 μA/cm² or less were rated as good and cases where at least one of the values was more than 5.0 μA/cm² was rated as poor.

Table 3 shows that all of the invention examples had low maximum current densities in the cycles (2) and (9) and thereby achieve good corrosion resistance in a wide potential range.

In contrast, good corrosion resistance is not achieved when the surface coating does not satisfy the adequate range according to embodiments of the present invention although the chemical components satisfy the adequate range according to embodiments of the present invention. Further, the corrosion resistance of No. 13 with a low Cr content was poor, since it lacked basic corrosion resistance although the surface coating thereof was satisfactory.

Example 3

The cold-rolled annealed sheet obtained in Example 1 was subjected to an electrolyzation treatment under different conditions, and analysis and evaluation were conducted as in Examples 1 and 2. The results are shown in Table 4.

As shown in Table 4, a surface coating having an intensity ratio [(OO/OH)/(Cr/Fe)] of 1.0 or more determined by X-ray photoelectron spectroscopy analysis cannot be obtained when the electrolyzation conditions do not satisfy the adequate range according to embodiments of the present invention and thus good corrosion resistance is not achieved.

Example 4

Steels having chemical compositions shown in Table 5 (steel types k, l, m, n, o, p, and q are austenitic stainless steels, steel type r is a dual-phase stainless steel) were melted in a vacuum melting furnace and each of the resulting ingots was heated to 1150° C. or more and then hot-rolled into a hot-rolled sheet having a thickness of 5 mm. The hot-rolled sheet was annealed at 1000° C. to 1100° C., pickled to remove scales, and then repeatedly subjected to cold-rolling, annealing, and pickling to obtain a cold-rolled annealed sheet having a thickness of 0.7 mm. The resulting cold-rolled annealed sheet was subjected to an anodic electrolyzation treatment in a 80° C. aqueous solution of sodium sulfate (1.4 mol/L) for 60 seconds at 1.4 V (60 mA/cm²).

After the electrolyzation treatment, a surface (coating) of the resulting steel sheet was analyzed by X-ray photoelectron spectroscopy analysis to determine the intensity ratios (OO/OH), (Cr/Fe), and (OO/OH)/(Cr/Fe).

The results compared with the cases when no electrolyzation was conducted are shown in Table 6. As shown in Table 6, when the electrolyzation treatment was performed according to embodiments of the present invention, a surface coating having an intensity ratio [(OO/OH)/(Cr/Fe)] of 1.0 or more determined by X-ray photoelectron spectroscopy analysis was obtained.

Example 5

A 30 mm×30 mm test piece was cut out from an electrolyzed material and a cold-rolled sheet shown in Table 6, degreased with acetone, and subjected to a polarization treatment in the following order at a sweep velocity of 60 mV/min in sulfuric acid having pH of 3 (80° C.) simulating the operating environment of a fuel cell to evaluate corrosion resistance from a high-potential environment to a low-potential environment:

(1) corrosion potential→1.2 V→0.8V
(2) 0.8 V→1.2 V→0.8 V
(3) 0.8 V→1.2 V→0.8 V
(4) 0.8 V→1.2 V→0.8 V
(5) 0.8 V→1.2 V→0.7 V
(6) 0.7 V→1.2 V→0.6 V
(7) 0.6 V→1.2 V→0.5 V
(8) 0.5 V→1.2 V→0.4 V
(9) 0.4 V→1.2 V→0.3 V The flowing current includes dissolution, oxidation, reduction, etc. of the respective elements. However, it is obvious that the corrosion resistance of the material that corresponds to a smaller flowing current i.e., that does hardly undergo the above-described reactions, is high. Accordingly, the values of the flowing current were compared. In particular, the maximum current density (absolute value) of the cycles (2) and (9) was determined.

The results are shown in Table 7. The cases where both values were 5.0 $\mu A/cm^2$ or less were rated as good and cases where at least one of the values was more than 5.0 $\mu A/cm^2$ was rated as poor.

Table 7 shows that all of the invention examples had low maximum current densities in the cycles (2) and (9) and thereby achieve good corrosion resistance in a wide potential range. Further, the corrosion resistance of No. 35 with a low Cr content was poor, since it lacks basic corrosion resistance although the surface coating thereof was satisfactory.

According to the present invention, a stainless steel for a fuel cell having good corrosion resistance in a wide potential range can be obtained so that a low-cost stainless steel separator can be provided to a fuel cell that has been using expensive carbon and gold-plated separators, and thus spread of fuel cells can be accelerated.

TABLE 1

| Steel Type | Chemical composition (mass %) | | | | | | | | | | | | Note |
|---|---|---|---|---|---|---|---|---|---|---|---|---|---|
| | C | Si | Mn | P | S | Al | N | Cr | Nb | Ti | Zr | Mo | |
| a | 0.004 | 0.23 | 0.19 | 0.028 | 0.005 | 0.11 | 0.008 | 30.0 | 0.18 | — | — | 2.00 | Preferred steel |
| b | 0.002 | 0.22 | 0.28 | 0.023 | 0.007 | 0.13 | 0.010 | 30.2 | 0.30 | — | — | 1.00 | Preferred steel |
| c | 0.005 | 0.21 | 0.17 | 0.027 | 0.006 | 0.09 | 0.009 | 30.1 | 0.51 | — | — | — | Preferred steel |
| d | 0.004 | 0.23 | 0.18 | 0.027 | 0.005 | 0.09 | 0.008 | 25.1 | 0.48 | — | — | 1.98 | Preferred steel |
| e | 0.004 | 0.22 | 0.18 | 0.027 | 0.005 | 0.10 | 0.008 | 25.2 | — | — | 0.23 | 1.00 | Preferred steel |
| f | 0.008 | 0.24 | 0.15 | 0.035 | 0.002 | 0.06 | 0.005 | 25.3 | — | 0.35 | — | — | Preferred steel |
| g | 0.004 | 0.22 | 0.12 | 0.025 | 0.003 | 0.09 | 0.006 | <u>14.9</u> | 0.54 | — | — | 1.56 | Comparative Example |
| h | 0.006 | 0.20 | 0.22 | 0.020 | 0.003 | 0.08 | 0.003 | 21.7 | 0.44 | — | — | 0.81 | Preferred steel |
| i | 0.005 | 0.26 | 0.19 | 0.029 | 0.003 | 0.07 | 0.007 | 38.4 | 0.47 | — | — | 1.23 | Preferred steel |
| j | 0.005 | 0.23 | 0.20 | 0.026 | 0.004 | 0.10 | 0.008 | <u>42.9</u> | 0.38 | — | — | 1.29 | Comparative Example |

TABLE 2

| Sample No. | Steel type | Electrolyzation treatment | (OO/OH) ratio (intensity ratio) | (Cr/Fe) ratio (intensity ratio) | (Cr/Fe) ratio in coating (atom %) | (OO/OH)/(Cr/Fe) ratio (intensity ratio) | Note |
|---|---|---|---|---|---|---|---|
| 1 | a | Yes | 1.13 | 1.04 | 0.24 | 1.09 | Invention Example |
| 2 | a | No | 0.54 | 2.54 | 0.75 | <u>0.21</u> | Comparative Example |
| 3 | b | Yes | 1.17 | 0.96 | 0.23 | 1.22 | Invention Example |
| 4 | b | No | 0.56 | 2.47 | 0.69 | <u>0.23</u> | Comparative Example |
| 5 | c | Yes | 1.20 | 0.96 | 0.25 | 1.25 | Invention Example |
| 6 | c | No | 0.57 | 2.45 | 0.60 | <u>0.23</u> | Comparative Example |
| 7 | d | Yes | 1.31 | 0.58 | 0.12 | 2.26 | Invention Example |
| 8 | d | No | 0.62 | 2.25 | 0.59 | <u>0.28</u> | Comparative Example |
| 9 | e | Yes | 1.35 | 0.57 | 0.14 | 2.37 | Invention Example |
| 10 | e | No | 0.62 | 2.22 | 0.55 | <u>0.28</u> | Comparative Example |
| 11 | f | Yes | 1.38 | 0.55 | 0.14 | 2.51 | Invention Example |
| 12 | f | No | 0.67 | 2.10 | 0.49 | <u>0.32</u> | Comparative Example |
| 13 | g | Yes | 1.47 | 0.19 | 0.04 | 7.74 | Comparative Example |
| 14 | g | No | 0.73 | 0.79 | 0.19 | <u>0.92</u> | Comparative Example |
| 15 | h | Yes | 1.41 | 0.43 | 0.14 | 3.28 | Invention Example |
| 16 | h | No | 0.69 | 1.20 | 0.35 | <u>0.58</u> | Comparative Example |
| 17 | i | Yes | 0.98 | 0.97 | 0.21 | 1.01 | Invention Example |
| 18 | i | No | 0.51 | 2.66 | 0.77 | <u>0.19</u> | Comparative Example |
| 19 | j | Yes | 0.58 | 1.18 | 0.31 | <u>0.69</u> | Comparative Example |
| 20 | j | No | 0.42 | 2.73 | 0.94 | <u>0.15</u> | Comparative Example |

TABLE 3

| Sample No. | Maximum current density in (2) ($\mu A/cm^2$) | Maximum current density in (9) ($\mu A/cm^2$) | Rating | Note |
|---|---|---|---|---|
| 1 | 3.2 | 3.8 | ○: Good | Invention Example |
| 2 | 5.7 | 5.3 | X: Poor | Comparative Example |
| 3 | 2.8 | 3.6 | ○: Good | Invention Example |
| 4 | 5.6 | 5.3 | X: Poor | Comparative Example |
| 5 | 2.9 | 3.5 | ○: Good | Invention Example |
| 6 | 5.6 | 5.1 | X: Poor | Comparative Example |
| 7 | 2.3 | 3.3 | ○: Good | Invention Example |
| 8 | 5.4 | 5.1 | X: Poor | Comparative Example |
| 9 | 2.2 | 3.2 | ○: Good | Invention Example |
| 10 | 5.4 | 5.1 | X: Poor | Comparative Example |
| 11 | 2.0 | 3.0 | ○: Good | Invention Example |
| 12 | 5.3 | 4.9 | X: Poor | Comparative Example |
| 13 | 3.4 | 8.7 | X: Poor | Comparative Example |
| 14 | 4.0 | 9.3 | X: Poor | Comparative Example |
| 15 | 2.0 | 3.7 | ○: Good | Invention Example |
| 16 | 4.7 | 5.1 | X: Poor | Comparative Example |
| 17 | 4.1 | 4.3 | ○: Good | Invention Example |
| 18 | 6.1 | 6.5 | X: Poor | Comparative Example |
| 19 | 4.8 | 5.1 | X: Poor | Comparative Example |
| 20 | 6.4 | 6.6 | X: Poor | Comparative Example |

TABLE 4

| Sample No. | Steel type | Electrolyzation potential (V vs SHE) | Electrolyzation time (sec) | pH | Sodium sulfate concentration (mol/L) | (OO/OH) ratio (intensity ratio) | (Cr/Fe) ratio (intensity ratio) | (OO/OH)/(Cr/Fe) ratio (intensity ratio) | Maximum current density in (2) ($\mu A/cm^2$) | Maximum current density in (9) ($\mu A/cm^2$) | Rating | Note |
|---|---|---|---|---|---|---|---|---|---|---|---|---|
| 7 | d | 1.4 | 60 | 6.5 | 1.4 | 1.31 | 0.58 | 2.26 | 2.3 | 3.3 | ○: Good | Invention Example |
| 21 | d | 0.4 | 60 | 6.5 | 1.4 | 0.42 | 1.03 | 0.41 | 5.5 | 5.1 | X: Poor | Comparative Example |
| 22 | d | 0.8 | 60 | 6.5 | 1.4 | 1.05 | 0.62 | 1.69 | 2.7 | 3.5 | ○: Good | Invention Example |
| 23 | d | 1.4 | 3 | 6.5 | 1.4 | 0.87 | 1.05 | 0.83 | 5.2 | 4.9 | X: Poor | Comparative Example |
| 24 | d | 1.4 | 10 | 6.5 | 1.4 | 1.09 | 0.66 | 1.65 | 2.8 | 3.7 | ○: Good | Invention Example |
| 25 | d | 1.4 | 60 | 7.5 | 1.4 | 0.63 | 0.84 | 0.75 | 5.4 | 5.1 | X: Poor | Comparative Example |
| 26 | d | 1.4 | 60 | 2.5 | 1.4 | 1.37 | 0.59 | 2.32 | 2.3 | 3.2 | ○: Good | Invention Example |
| 27 | d | 1.4 | 60 | 6.5 | 0.04 | 0.96 | 1.02 | 0.94 | 5.1 | 4.9 | X: Poor | Comparative Example |
| 28 | d | 1.4 | 60 | 6.5 | 0.3 | 1.30 | 0.65 | 2.00 | 2.5 | 3.3 | ○: Good | Invention Example |

TABLE 5

| Steel Type | Chemical composition (mass %) | | | | | | | | | | Note |
|---|---|---|---|---|---|---|---|---|---|---|---|
| | C | Si | Mn | P | S | Ni | Cr | Mo | Cu | N | |
| k | 0.012 | 0.32 | 0.94 | 0.023 | 0.003 | 8.5 | 17.9 | — | — | 0.03 | Preferred steel |
| l | 0.019 | 0.42 | 0.88 | 0.013 | 0.001 | 12.5 | 17.4 | 2.15 | — | 0.02 | Preferred steel |
| m | 0.021 | 0.61 | 0.38 | 0.031 | 0.002 | 13.3 | 18.5 | 1.41 | 2.13 | 0.01 | Preferred steel |
| n | 0.042 | 0.72 | 0.97 | 0.019 | 0.001 | 19.2 | 24.8 | — | — | 0.03 | Preferred steel |
| o | 0.030 | 0.45 | 0.55 | 0.025 | 0.004 | 11.2 | 15.6 | — | — | 0.02 | Comparative Example |
| p | 0.057 | 0.33 | 0.99 | 0.040 | 0.007 | 8.7 | 18.4 | — | — | 0.05 | Preferred steel |
| q | 0.043 | 0.75 | 0.57 | 0.028 | 0.005 | 12.9 | 17.3 | 2.05 | — | 0.07 | Preferred steel |
| r | 0.057 | 0.36 | 0.80 | 0.032 | 0.004 | 4.4 | 24.4 | 1.93 | — | 0.06 | Preferred steel |

TABLE 6

| Sample No. | Steel type | Electrolyzation treatment | (OO/OH) ratio (intensity ratio) | (Cr/Fe) ratio (intensity ratio) | (OO/OH)/(Cr/Fe) ratio (intensity ratio) | Note |
|---|---|---|---|---|---|---|
| 29 | k | Yes | 1.02 | 0.75 | 1.36 | Invention Example |
| 30 | k | No | 0.37 | 1.87 | 0.20 | Comparative Example |
| 31 | l | Yes | 1.05 | 0.81 | 1.30 | Invention Example |
| 32 | l | No | 0.41 | 2.03 | 0.20 | Comparative Example |
| 33 | m | Yes | 1.06 | 0.78 | 1.36 | Invention Example |
| 34 | n | Yes | 1.05 | 0.94 | 1.12 | Invention Example |
| 35 | o | Yes | 1.07 | 0.68 | 1.57 | Comparative Example |
| 36 | p | Yes | 1.05 | 0.74 | 1.42 | Invention Example |

TABLE 6-continued

| Sample No. | Steel type | Electrolyzation treatment | (OO/OH) ratio (intensity ratio) | (Cr/Fe) ratio (intensity ratio) | (OO/OH)/(Cr/Fe) ratio (intensity ratio) | Note |
|---|---|---|---|---|---|---|
| 37 | q | Yes | 1.01 | 0.83 | 1.22 | Invention Example |
| 38 | r | Yes | 1.04 | 0.89 | 1.17 | Invention Example |

TABLE 7

| Sample No. | Maximum current density in (2) (µA/cm2) | Maximum current density in (9) (µA/cm2) | Rating | Note |
|---|---|---|---|---|
| 29 | 3.1 | 3.6 | ○: Good | Invention Example |
| 30 | 5.4 | 5.2 | X: Poor | Comparative Example |
| 31 | 3.1 | 3.4 | ○: Good | Invention Example |
| 32 | 5.5 | 5.2 | X: Poor | Comparative Example |
| 33 | 3.2 | 3.6 | ○: Good | Invention Example |
| 34 | 2.8 | 3.7 | ○: Good | Invention Example |
| 35 | 3.6 | 8.5 | X: Poor | Comparative Example |
| 36 | 3.0 | 3.7 | ○: Good | Invention Example |
| 37 | 2.9 | 3.6 | ○: Good | Invention Example |
| 38 | 2.8 | 3.6 | ○: Good | Invention Example |

The invention claimed is:

1. A stainless steel for a fuel cell, comprising a coating having an intensity ratio [(OO/OH)/(Cr/Fe)] of 1.0 or more determined by X-ray photoelectron spectroscopy analysis on a surface of a stainless steel containing 16% by mass or more of Cr, the coating having been treated by anodic electrolyzation treatment in an electrolyte solution having a sodium sulfate concentration of 0.1 to 3.0 mol/L and H of 7 or less at a potential of 0.8 to 1.8 V vs. SHE for 10 seconds or loner.

2. The stainless steel for a fuel cell according to claim 1, wherein the stainless steel further contains, in terms of percent by mass, Mo: 4.0% or less.

3. The stainless steel for a fuel cell according to claim 1, wherein an intensity ratio (OO/OH) of the coating on the surface is 0.6 or more determined by X-ray photoelectron spectroscopy analysis.

4. The stainless steel for a fuel cell according to claim 1, wherein an intensity ratio (Cr/Fe) of the coating on the surface is 0.2 or more and 1.0 or less determined by X-ray photoelectron spectroscopy analysis.

5. The stainless steel for a fuel cell according to claim 1, wherein an intensity ratio (OO/OH) of the coating on the surface is 0.6 or more determined by X-ray photoelectron spectroscopy analysis and an intensity ratio (Cr/Fe) of the coating on the surface is 0.2 or more and 1.0 or less determined by X-ray photoelectron spectroscopy analysis.

6. A stainless steel for a fuel cell, comprising a coating being formed on a surface of a stainless steel having a composition that includes, in terms of percent by mass, C: 0.03% or less, Si: 1.0% or less, Mn: 1.0% or less, S: 0.01% or less, P: 0.05% or less, Al: 0.20% or less, N: 0.03% or less, Cr: 20 to 40%, at least one selected from Nb, Ti, and Zr, in total: 1.0% or less, and the balance being Fe and unavoidable impurities, by performing an anodic electrolyzation treatment in an electrolyte solution, and having an intensity ratio [(OO/OH)/(Cr/Fe)] of 1.0 or more determined by X-ray photoelectron spectroscopy analysis, wherein the anodic electrolyzation treatment is performed in an electrolyte solution having a sodium sulfate concentration of 0.1 to 3.0 mol/L and pH of 7 or less at a potential of 0.8 to 1.8 V vs. SHE for 10 seconds or longer.

7. The stainless steel for a fuel cell according to claim 6, wherein the stainless steel has a composition that includes, in terms of percent by mass, C: more than 0% and 0.03% or less.

8. The stainless steel for a fuel cell according to claim 6, wherein the stainless steel has a composition that includes, in terms of percent by mass, Si: more than 0% and 1.0% or less.

9. The stainless steel for a fuel cell according to claim 6, wherein the stainless steel has a composition that includes, in terms of percent by mass, Mn: more than 0% and 1.0% or less.

10. The stainless steel for a fuel cell according to claim 6, wherein the stainless steel has a composition that includes, in terms of percent by mass, S: more than 0% and 0.01% or less.

11. The stainless steel for a fuel cell according to claim 6, wherein the stainless steel has a composition that includes, in terms of percent by mass, P: more than 0% and 0.05% or less.

12. The stainless steel for a fuel cell according to claim 6, wherein the stainless steel has a composition that includes, in terms of percent by mass, Al: more than 0% and 0.20% or less.

13. The stainless steel for a fuel cell according to claim 6, wherein the stainless steel has a composition that includes, in terms of percent by mass, N: more than 0% and 0.03% or less.

14. A stainless steel for a fuel cell, comprising a coating having an intensity ratio [(OO/OH)/(Cr/Fe)] of 1.0 or more determined by X-ray photoelectron spectroscopy analysis on a surface of a stainless steel containing 16% by mass or more of Cr, the coating having been treated by anodic electrolyzation in an electrolyte solution having a sodium sulfate concentration of 0.1 to 3.0 mol/L and pH of 7 or less at a potential of 0.8 to 1.8 V vs. SHE for 10 seconds or longer, and the coating having a maximum current density (absolute value) of 5.0 µA/cm2 or less during the second and ninth cycle when subjected to a polarization treatment in the following order at a sweep velocity of 60 mV/min in sulfuric acid having pH of 3 (80° C.):

(1) corrosion potential to 1.2V to 0.8V
(2) 0.8V to 1.2V to 0.8V
(3) 0.8V to 1.2V to 0.8V
(4) 0.8V to 1.2V to 0.8V
(5) 0.8V to 1.2V to 0.7V
(6) 0.7V to 1.2V to 0.6V
(7) 0.6V to 1.2V to 0.5V
(8) 0.5V to 1.2V to 0.4V
(9) 0.4V to 1.2V to 0.3V.

* * * * *